(No Model.)
I. M. SMITH.
SAW.
No. 318,316.   Patented May 19, 1885.
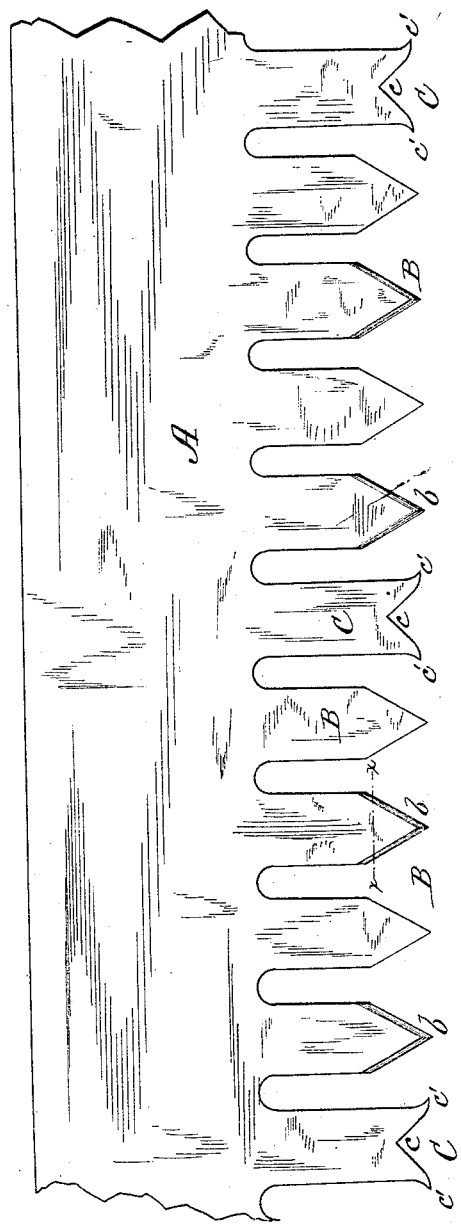
WITNESSES:
W. W. Hollingsworth
John A. Kennon
INVENTOR:
I. M. Smith
BY Munn & Co.
ATTORNEYS.

UNITED STATES PATENT OFFICE.

ISAAC MORGAN SMITH, OF PALMYRA, INDIANA.

SAW.

SPECIFICATION forming part of Letters Patent No. 318,316, dated May 19, 1885.

Application filed March 6, 1885. (No model.)

*To all whom it may concern:*

Be it known that I, ISAAC MORGAN SMITH, a citizen of the United States, residing at Palmyra, in the county of Harrison and State of Indiana, have invented certain new and useful Improvements in Crosscut-Saws, of which the following is a description.

Figure 1 in the drawings represents a side view of a portion of the blade of my improved saw. Fig. 2 is a cross-section through one of the teeth, taken on the line $x$ $x$ in Fig. 1.

My invention relates to crosscut-saws; and it consists in the novel combination of certain forms of teeth in the same saw-blade, whereby the saw is made to operate with increased efficiency and requires less power to work it, and whereby the said saw will start in straight without any side cutting or scratching, and will continue to make a smooth, equal, and uniform cut throughout the whole of its passage through the material operated on.

In carrying out my invention I use two forms of teeth in the same blade. One of these is lancet-shaped, and has its edges beveled on one side, so as to have sharp cutting-edges. The other form of tooth has straight sides and is divided into two at its lower extremity. The lancet-shaped teeth are arranged in separate series of four similar teeth alternating with one straight-sided tooth. Every alternate lancet-shaped tooth in each series of four is swaged or set in an opposite direction, and has its beveled cutting-edges arranged accordingly, so that each series consists of two teeth set to the right and two teeth set to the left. The straight-sided teeth or rakers are at first formed of the same length as the lancet-shaped teeth. A steel tool is then driven into the division at the lower extremity, so that each raker-tooth is bent, forming two small hooks having their points in opposite directions and making each raker-tooth slightly shorter than the lancet-shaped teeth. This causes the straight-sided teeth to rake the sawdust better and prevents them from hanging when going through solid timber.

I will now describe my invention more particularly with reference to the accompanying drawings, in which similar letters of reference indicate corresponding parts in both the figures.

A is a portion of a saw-blade having a series of lancet-shaped teeth, B, therein, and with straight-sided teeth C alternating between each series of four lancet-shaped teeth. All the teeth B and C are the same distance apart. Each tooth B has beveled cutting-edges $b$ on one side of it and is swaged or set to one side. In each series of four teeth B every alternate tooth is swaged in an opposite direction, and has its cutting-edges $b$ arranged accordingly, so that each series of teeth B consists of two set to the right and two set to the left. The straight-sided teeth C are at first formed of the same length as the lancet-shaped teeth B, and have a division, $c$, formed in their lower extremity. A tool is then driven into the division $c$, so that two small hooks, $c'$, are formed which have their points in opposite directions, and the teeth C are thereby made slightly shorter than teeth B.

I am aware of the existence of a saw having double-pointed cutting-teeth alternating with plow-teeth, the points of which are curved outward in opposite directions.

Having thus described my invention, what I claim as new, and desire to secure by Letters Patent, is—

A crosscut-saw the blade of which is provided with a series of lancet-shaped teeth having beveled cutting-edges and set alternately in opposite directions, in combination with straight-sided teeth made slightly shorter than the said lancet-shaped teeth and having their lower extremities formed into two hooks which have their points in opposite directions, said straight-sided teeth alternating between each series of the lancet-shaped teeth, substantially as described and shown, and for the purpose set forth.

ISAAC MORGAN SMITH.

Witnesses:
JOHN F. FINLEY,
JOHN H. MARTIN.